US012051556B2

(12) United States Patent
Guynn et al.

(10) Patent No.: US 12,051,556 B2
(45) Date of Patent: Jul. 30, 2024

(54) LOCK OUT AND TAG OUT CONTROL SYSTEM AND METHOD

(71) Applicant: HOLLYMATIC CORPORATION, Countryside, IL (US)

(72) Inventors: Victor Guynn, Romeoville, IL (US); David Baarman, Fennville, MI (US)

(73) Assignee: HOLLYMATIC CORPORATION, Countryside, IL (US)

( * ) Notice: Subject to any disclaimer, the term of this patent is extended or adjusted under 35 U.S.C. 154(b) by 102 days.

(21) Appl. No.: 17/625,143

(22) PCT Filed: Jul. 30, 2020

(86) PCT No.: PCT/US2020/044176
§ 371 (c)(1),
(2) Date: Jan. 6, 2022

(87) PCT Pub. No.: WO2021/025936
PCT Pub. Date: Feb. 11, 2021

(65) Prior Publication Data

US 2022/0270835 A1 Aug. 25, 2022

Related U.S. Application Data

(60) Provisional application No. 62/882,219, filed on Aug. 2, 2019.

(51) Int. Cl.
*H01H 9/28* (2006.01)
*H01H 9/26* (2006.01)

(52) U.S. Cl.
CPC .............. *H01H 9/281* (2013.01); *H01H 9/26* (2013.01)

(58) Field of Classification Search
CPC ................................ H01H 9/281; H01H 9/26
See application file for complete search history.

(56) References Cited

U.S. PATENT DOCUMENTS

| | | | | |
|---|---|---|---|---|
| 7,311,247 | B1 | 12/2007 | Lenner | |
| 9,881,749 | B1 * | 1/2018 | Griffin | E05B 63/0004 |
| 2006/0151306 | A1 | 7/2006 | Lau et al. | |
| 2014/0111303 | A1 * | 4/2014 | Scharnick | G07C 9/20 340/5.2 |
| 2014/0176303 | A1 | 6/2014 | Stratton et al. | |
| 2020/0227215 | A1 * | 7/2020 | Göransson | H01H 83/12 |

OTHER PUBLICATIONS

International Search Report of PCT/US2020/044176 dated Oct. 16, 2020 [PCT/ISA/210].
Written Opinion of PCT/US2020/044176 dated Oct. 16, 2020 [PCT/ISA/237].

* cited by examiner

*Primary Examiner* — Jared Fureman
*Assistant Examiner* — Duc M Pham
(74) *Attorney, Agent, or Firm* — Sughrue Mion, PLLC

(57) ABSTRACT

A system including at least one sub-system that includes a first actuator configured to control a supply of a respective energy; a power lockout system including at least one switch configured to open and close an electrical connection between a power supply and the first actuator; a body configured to move between a first position and a second position to open and close the electrical connection; and at least one processor configured to control, during a power down process, the first actuator of the each of the at least one sub-system to reduce the respective energy of the sub-system.

20 Claims, 9 Drawing Sheets

810

810

810

LOCK OUT AND TAG OUT CONTROL SYSTEM AND METHOD

CROSS-REFERENCE TO RELATED APPLICATION

This application claims priority from U.S. Provisional Application No. 62/882,219, filed on Aug. 2, 2019, the disclosure of which is incorporated herein by reference in its entirety.

BACKGROUND

Some embodiments of the present disclosure relate to various ways to automate the management and control of hazardous energy.

SUMMARY

Some embodiments of the present disclosure have several key solutions to past problems that have been observed. Some of the embodiments of the present disclosure provide better results in hazardous energy control. A hazardous energy control system of an embodiment of the present disclosure is designed to enable and verify that power has successfully been removed. An embodiment of the system includes air, hydraulics, and power with no single point of failure. A multiple sensor system may have a shut down period where the hazardous energy system removes the danger of energy in the system. The system may be configured to be formally shut off and tagged out after energy is removed from the system.

Embodiments of this disclosure may enable a more reliable hazardous energy control system. Past solutions are not designed for automation and flawless human interface.

Other lock out solutions may allow for primary control. Some embodiments of the present disclosure enable secondary control, monitoring, and additional protection. Some embodiments of the present disclosure also provide a very simple way to disable and depower multiple sub-systems.

According to one or more embodiments, a system is provided that includes: at least one sub-system, each sub-system of the at least one sub-system including a first actuator configured to control a supply of a respective energy, the respective energy controlled by the first actuator of the each sub-system being one from among air pressure, hydraulic pressure, and mechanical energy of an actuated body, and a power lockout system. The power lockout system includes at least one switch configured to open and close an electrical connection between a power supply and the first actuator of one or more of the at least one sub-system, and a body configured to move between a first position and a second position, the first position being a position in which the body causes the at least one switch to open the electrical connection and in which a portion of the body is configured to engage with a lockout body that is configured to cause the body to be locked out in the first position, and the second position being a position in which the body causes the at least one switch to close the electrical connection. The system further includes at least one processor configured to control, during a power down process, the first actuator of the each of the at least one sub-system to reduce the respective energy of the sub-system.

According to an embodiment, the at least one sub-system includes a first sub-system and a second sub-system.

According to an embodiment, the first actuator of the first sub-system is configured to control a supply of one from among a group of air pressure, hydraulic pressure, and mechanical energy of the actuated body, within the first sub-system, and the first actuator of the second sub-system is configured to control a supply of another from among the group of air pressure, hydraulic pressure, and mechanical energy of the actuated body, within the second sub-system.

According to an embodiment, the first actuator of the second sub-system is configured to actuate a vent or valve that is configured to control a supply of air pressure or hydraulic pressure within the second sub-system, and the at least one processor is configured to control, during the power down process, the second sub-system to reduce the supply of air pressure or hydraulic pressure within the sub-system by actuating the vent or valve, based on a signal from at least one sensor of the second sub-system.

According to an embodiment, the at least one sub-system includes a first sub-system, a second sub-system, and a third sub-system, the first actuator of the first sub-system is a motor that is configured to cause a supply of the mechanical energy, within the first sub-system, by receiving electrical energy, the first actuator of the second sub-system is a motor that is configured to cause a supply of hydraulic pressure, within the second sub-system, by receiving electrical energy, and the first actuator of the third sub-system is a motor that is configured to cause a supply of the air pressure, within the third sub-system, by receiving electrical energy.

According to an embodiment, the power lockout system further includes a second actuator configured to control the body to move into or maintain in the first position or the second position, and the at least one processor is further configured to control the second actuator, during the power down process, to allow the body to move into the first position based on the respective energy of the one or more of the at least one sub-system being equal to or below a predetermined level.

According to an embodiment, the second actuator includes a pin that is configured to maintain the body in the second position by actuating into a hole of the body when the body is in the second position.

According to an embodiment, the second actuator is configured to actuate the body into the first position or the second position.

According to an embodiment, the at least one processor is configured to control, during the power down process, the first actuator of each of the at least one sub-system to reduce the respective energy of the sub-system based on a signal from at least one sensor of the at least one sub-system.

According to one or more embodiments, a monitoring system for a machine system is provided. The machine system includes at least one sub-system that each includes a first actuator configured to control a supply of a respective energy, the respective energy controlled by the first actuator of each sub-system of the at least one sub-system being one from among air pressure, hydraulic pressure, and mechanical energy of an actuated body. The monitoring system includes a power lockout system including at least one switch configured to open and close an electrical connection between a power supply and the first actuator of one or more of the at least one sub-system, and a body configured to move between a first position and a second position, the first position being a position in which the body causes the at least one switch to open the electrical connection and in which a portion of the body is configured to engage with a lockout body that is configured to cause the body to be locked out in the first position, and the second position being a position in which the body causes the at least one switch to close the electrical connection. The monitoring system further includes at least one processor configured to control, during a power down process, the first actuator of each of the at least one sub-system to reduce the respective energy of the sub-system based on a first signal from at least one sensor of the at least one sub-system.

According to an embodiment, the power lockout system further includes a second actuator configured to control the body to move into or maintain in the first position or the second position, and the at least one processor is further configured to control the second actuator, during the power down process, to allow the body to move into the first position based on the respective energy of one or more of the at least one sub-system being equal to or below a predetermined level.

According to an embodiment, the second actuator includes a pin that is configured to maintain the body in the second position by actuating into a hole of the body when the body is in the second position.

According to an embodiment, the second actuator is configured to actuate the body into the first position or the second position.

According to an embodiment, the at least one processor is configured to control the second actuator, during the power down process, to allow the body to move into the first position based on a second signal from the at least one sensor of the at least one sub-system indicating that the respective energy of the one or more of the at least one sub-system is equal to or below the predetermined level.

According to one or more embodiments, a method of shutting down a system is provided. The system includes at least one sub-system, each sub-system of the at least one sub-system including a first actuator configured to control a supply of a respective energy, the respective energy controlled by the first actuator of the each sub-system being one from among air pressure, hydraulic pressure, and mechanical energy of an actuated body. The method includes: receiving, by at least one processor, a signal that indicates the system is to be shut down; determining, by the at least one processor, based on a signal from at least one sensor of the each sub-system, whether the respective energy of the each sub-system is equal to or below a respective predetermined level; controlling, based on determining that the respective energy of the at least one sub-system is not equal to or below the respective predetermined level by the at least one processor, the first actuator of each of the at least one sub-system to reduce the respective energy of the at least one sub-system; controlling, based on determining that the respective energy of the at least one sub-system is equal to or below the respective predetermined level by the at least one processor, a second actuator of a power lockout system to allow a body of the power lockout system to move from a second position, in which the body closes an electrical connection between a power supply and the first actuator of the at least one sub-system, to a first position, in which the body causes the electrical connection to be opened; and engaging, when the body of the power lockout system is in the first position, a lockout body with the body such that the lockout body causes the body to be locked out in the first position.

According to an embodiment, the method further includes detecting, by the at least one processor, whether the lockout body is engaged with the body of the power lockout system.

According to an embodiment, the second actuator includes a pin that is configured to maintain the body in the second position by actuating into a hole of the body when the body is in the second position.

According to an embodiment, the second actuator is configured to actuate the body into the first position or the second position.

According to an embodiment, the first actuator of each of the at least one sub-system is one from among a motor, a valve actuator, and a vent actuator.

According to an embodiment, the at least one sub-system includes a first sub-system and a second sub-system, the first actuator of the first sub-system is configured to control a supply of one from among a group of air pressure, hydraulic pressure, and mechanical energy of the actuated body, within the first sub-system, and the first actuator of the second sub-system is configured to control a supply of another from among the group of air pressure, hydraulic pressure, and mechanical energy of the actuated body, within the second sub-system.

DETAILED DESCRIPTION

Figure 1:
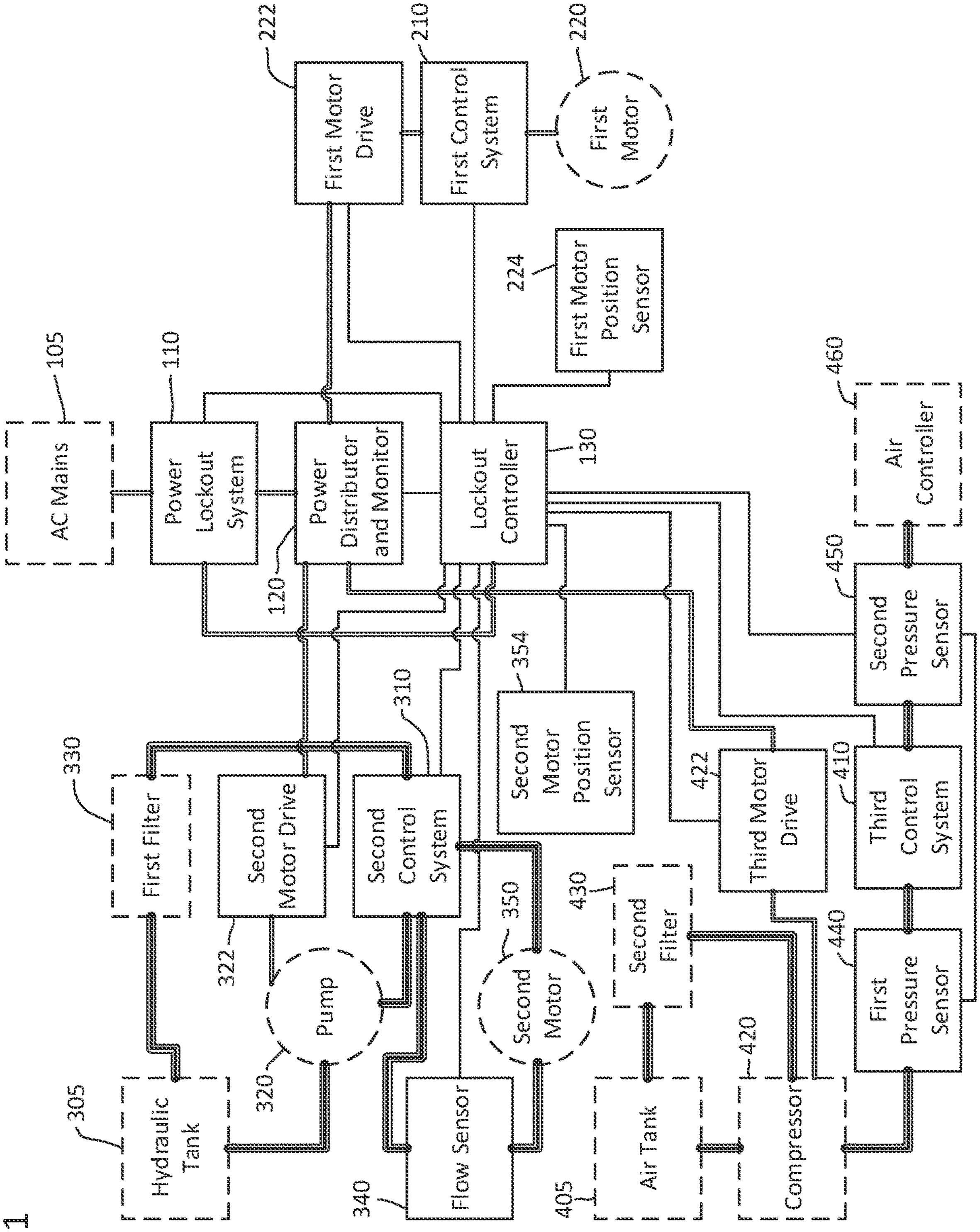
FIG. 1 illustrates an embodiment of a system for hazardous energy control.

FIG. 1 illustrates an embodiment of a system for hazardous energy control.

With reference to FIG. 1, single barred lines may refer to a communication pathway using, for example, one or more wired or wireless communication circuits, double-barred lines may refer to an electric pathway (e.g. one or more circuits) for supplying electric power to components of the system, and triple-barred lines may refer to a pathway (e.g. one or more pipes) for fluid (e.g. hydraulic fluid or air) in the sub-systems.

The system may include, for example, AC mains 105, a power lockout system 110, a power distributor and monitor 120, and a lockout controller 130. The system may further include, for example, a first sub-system that includes a first control system 210, a first motor 220, a first motor drive 222, and a first motor position sensor 224. The system may further include, for example, a second sub-system that includes a hydraulic tank 305, a second control system 310, a pump 320, a second motor drive 322, a first filter 330, a flow sensor 340, a second motor 350, and a second motor position sensor 354. The system may further include a third sub-system that includes an air tank 405, a third control system 410, a compressor 420, a third motor drive 422, a second filter 430, a first pressure sensor 440, a second pressure sensor 450, and an air controller 460. While the system is illustrated in FIG. 1 to include three sub-systems (e.g. an electric sub-system, a hydraulic sub-system, and a pneumatic sub-system), the system may include any number of sub-systems and types of sub-systems.

The lockout controller 130 may be a hazardous energy lockout controller that includes, for example, at least one processor with memory storing computer instructions that are configured to cause the hazardous energy lockout controller to perform its functions. The at least one processor of the lockout controller 130 may be communicatively connected to, for example, the power lockout system 110, the power distributor and monitor 120, the first motor drive 222, the first control system 210, the first motor position sensor 224, the second motor drive 322, the second control system 310, the flow sensor 340, the second motor position sensor 354, the third motor drive 422, the first pressure sensor 440, the third control system 410, and the second pressure sensor 450. The same processor or same processors of the at least one processor may be communicatively connected to the above components for communication (e.g. control or monitoring). Alternatively, or additionally, any number of the above components may each be communicatively connected to a respective processor of the at least one processor for communication. Communicatively connected may include any type of connection used for sending and receiving a signal including, for example, an electrical connection (e.g. using a circuit) or a connection via radio waves (e.g. using transmitters and receivers).

The first control system 210, the second control system 310, and the third control system 410 may each include a lockout(s) of a respective sub-system. For example, with reference to FIG. 1, the first control system 210 may include a lockout that locks out energy (e.g. electricity) from being received by the first motor 220, the second control system 310 may include a first control valve and lockout that is configured to lockout energy (e.g. hydraulic energy) from being received by the second motor 350 (e.g. a hydraulic actuator), and the third control system may include a second control valve with a vent and lockout that is configured to lockout energy (e.g. pneumatic energy) from being received by the air controller 460 (e.g. a pneumatic actuator).

The lockout controller 130 may control the first motor drive 222, the second motor drive 322, and the third motor drive 422 to drive or not drive the first motor 220, the pump 320, and the compressor 420, respectively.

The lockout controller 130 may cause power lockout of the first motor drive 222, the second motor drive 322, and the third motor drive 422. For example, the lockout controller 130 may control the power lockout system 110 to cause one or more lockouts of the first motor drive 222, the second motor drive 322, and the third motor drive 422 via controlling at least one component of the power lockout system 110. The power lockout system 110 may include at least one processor, with memory including computer instructions that are configured to control the at least one processor to perform its functions, that controls, for example, the components within the power lockout system 110 to actuate for lock out and lockout prevention. Alternatively or additionally, the lockout controller 130 may function as the power lockout system 110, such that the lockout controller 130 directly causes power lockout of one or more of the first motor drive 222, the second motor drive 322, and the third motor drive 422.

The power lockout system 110 may be communicatively connected to the power distributor and monitor 120. The power distributor and monitor 120 may include conductive pathways that branch and that supply power from the AC mains 105 to respective sub-system components of the system, including, for example, the first motor drive 222, the second motor drive 322, and the third motor drive 422. The power distributor and monitor 120 may also include at least one sensor that is configured to detect whether current, voltage, and/or power is being supplied to the sub-system components of the system via the conductive pathways extending from the power distributor and monitor 120. For example, a respective sensor may be provided with each conductive pathway of the power distributor and monitor 120 so that current or voltage may be detected with respect to power supplied (or not supplied) to each of the sub-system components. The power distributor and monitor 120 may also include at least one processor, with memory including computer instructions that are configured to control the at least one processor to perform its functions, that is connected to the one or more sensors of the power distributor and monitor 120 to monitor the current, voltage, and/or power supplied to each of the sub-system components, and communicate to the lockout controller 130 about the power status of such sub-system components. Alternatively or additionally, the sensors of the power distributor and monitor 120 may communicate with the lockout controller 130 and the lockout controller 130 may determine the power status of such sub-system components.

The lockout controller 130 may also control the first control system 210 connected to the first motor 220, the second control system 310 connected to the pump 320 and/or the second motor 350, and/or the third control system 410 connected to the compressor 420 and/or air controller 460 to cause lockout with respect to the first motor 220, the hydraulic system, and the pneumatic system illustrated in FIG. 1. The lockout controller 130 may control the first control system 210, the second control system 310, the third control system 410, and/or other control systems to lock out power to one or more actuated valves or vents of the control systems such that the valves or vents do not actuate via the power.

The lockout controller 130 may detect parameters of sub-systems of the system with a voltage continuity sensor of the first control system 210, the first motor position sensor 224, the second motor position sensor 354, the flow sensor 340, the first pressure sensor 440, and the second pressure sensor 450. The lockout controller 130 may also control the first control valve of the second control system 310, the second control valve of the third control system 410, and the actuated vent of the third control system 410.

The combination of the lockout controller 130, the power lockout system 110, and the power distributor and monitor 120 may be considered a monitoring system, and the monitoring system may be supplied power even when the sub-systems of the system are not supplied power. In other words, the monitoring system may be powered in isolation from the sub-systems. For example, one or more parts of the monitoring system may be supplied power by at least one battery that is shared by the one or more parts or separately provided for each of the one or more parts. The lockouts of the sub-systems may also be included in the monitoring system. The monitoring system may be configured to require being engaged and verified before safeties of lockouts of the system (e.g. power knife switch, solenoids, and lockout tag) are engaged or disengaged.

Each of the lockouts of the sub-systems of the system may have a structure that is the same as or similar to the power lockout systems, including, for example, the structure of the power lockout systems illustrated in FIGS. 1 and 4-6.

The lockouts of the sub-systems may, for example, have any structure that includes at least one body that prevents at least one electrical contact from moving to and/or from a position that enables a circuit to be completed such that current from the AC mains 105 (or another power supply)

may be provided to a subcomponent of the sub-system (e.g. the first motor 220, the pump 320, the compressor 420, vents, or valves). For example, the at least one body may be actuated such that the at least one body physically inhibits movement of a separately actuated electrical contact from moving to contact another electrical contact, and/or actuated such as to cause the electrical contact to move away from the other electrical contact, so as to avoid completing a circuit that enables subcomponents of the system (e.g. the first motor 220, the pump 320, the compressor 420, vents, or valves) to be actuated by power provided through the electrical contacts. For example, in an embodiment, by a circuit(s) not being completed, electric power to one or more of the first motor 220, the pump 320, and the compressor 420 may be prohibited such that the one or more of the first motor 220, the pump 320, and the compressor 420 are not actuated. Alternatively or additionally, in an embodiment, by a circuit(s) not being completed, electric power to one or more of valves and vents of the controls systems (e.g. second control system 310 and the third control system 410) may be prohibited such that the one or more of the valves and vents are maintained in a position that prevents energy (e.g. hydraulic or pneumatic energy) from being received by and causing actuation of, for example, the second motor 350 or the air controller 460.

The electrical contact(s) may be directly actuated by energy in the system (e.g. air, hydraulic fluid, etc.) or by actuators that are controlled by, for example, at least one processor with memory of the lockout or the lockout controller 130. Alternatively or additionally, the electrical contact(s) may be moved by physical interaction by a user (e.g. a power knife switch). Actuation of the at least one body may be, separately from the electrical contacts, directly actuated by energy in the system (e.g. air, hydraulic fluid, etc.) or by actuators that are controlled by, for example, at least one processor with memory of the control systems (e.g. first control system 210, second control system 310, or third control system 410) or the lockout controller 130. As an example of control by energy in the system, the at least one body may be provided in a lockout of a control system (e.g. the third control system 410) of an air sub-system and may be actuated by air in an embodiment, and the at least one body in a lockout of a control system (e.g. the second control system 310) of a hydraulic sub-system may be actuated by hydraulic fluid. In an embodiment, the at least one body may include or be the electrical contact(s) such that control of the electrical contacts may be by a single actuator or energy (as opposed to respective actuators or energies for actuating the at least one body and the electrical contact). Moreover, the power lockout system 110 illustrated in FIG. 1 may have structure that is the same or similar to the structures described above with respect to the lockouts of the sub-systems. According to the above structures, a lockout of the system may operate to provide and/or prevent lockout while avoiding being manually overridden by a physical interaction of a user.

In an embodiment, a shutdown may be initiated by turning a selector of the system to a first position of shut down. However, even when shutdown is initiated, the system may not turn off or lock out until hazardous energy is removed from the system. When the selector is rotated to a lock out or off position, the system may present a mechanical lock out loop for a padlock. When the padlock is sensed by the system, the tag indicator may indicate that the system is locked out. The system may communicate with a machine controller. Alternatively, the system may incorporate the machine controller. The system may verify the functions of the system and the machine controller via a watch-dog interface.

The system may include a hydraulic system as a sub-system of the system. The hydraulic system may include, for example, the hydraulic tank 305, the second control system 310, the pump 320, the second motor drive 322, the first filter 330, the flow sensor 340, the second motor 350, and the second motor position sensor 354.

The sub-system may use the first control valve and lockout of the second control system 310 to remove the hydraulic pressure from the sub-system, specifically the hydraulic system. The pump 320 may be removed from the circuit and also disabled. For example, the lockout controller 130 may cause the pump 320 to be disabled. The hydraulic system may be locked out, and once locked out, may be verified by the lockout controller 130 to have no flow based on an output of the flow sensor 340 and the second motor position sensor 354.

The system may also include at least one air activated system as a sub-system. Air-activated systems of the system may be locked out and vented using a valve (e.g. a valve of the third control system 410). In an embodiment, the system may include an air activated system comprising the air tank 405, the third control system 410, the compressor 420, the third motor drive 422, the second filter 430, the first pressure sensor 440, the second pressure sensor 450, and the air controller 460, as illustrated in FIG. 1.

The air in the air-activated system may be vented by the vent of the second control system 310, and multiple pressure sensors, such as the first pressure sensor 440 and the second pressure sensor 450, may be used to verify that the sub-system has no air pressure energy within it or air pressure below a predetermined amount. The motor control for the compressor 420, such as the third motor drive 422, may also be disabled. Motors used for activation may be first disabled using a drive controller, which may be incorporated in the lockout controller 130 or provided separately. Then, voltage may be monitored across a motor (such of the compressor 420) by, for example, the lockout controller 130. When the voltage is zero, a conductance measurement may be taken and the position of the compressor 420 may also be verified by the lockout controller 130, via a sensor, for no movement.

In an embodiment, a power up sequence of the system allows the system to switch from off to on and indicate when the various sub-systems of the system are up and running.

The various sub-systems of the system may include, for example, energy from air, fluid (e.g. water), electricity, or gravity that may cause injury. These forces, including pneumatic and hydraulic forces, may be fully locked out and tagged out of the system.

Figure 2:
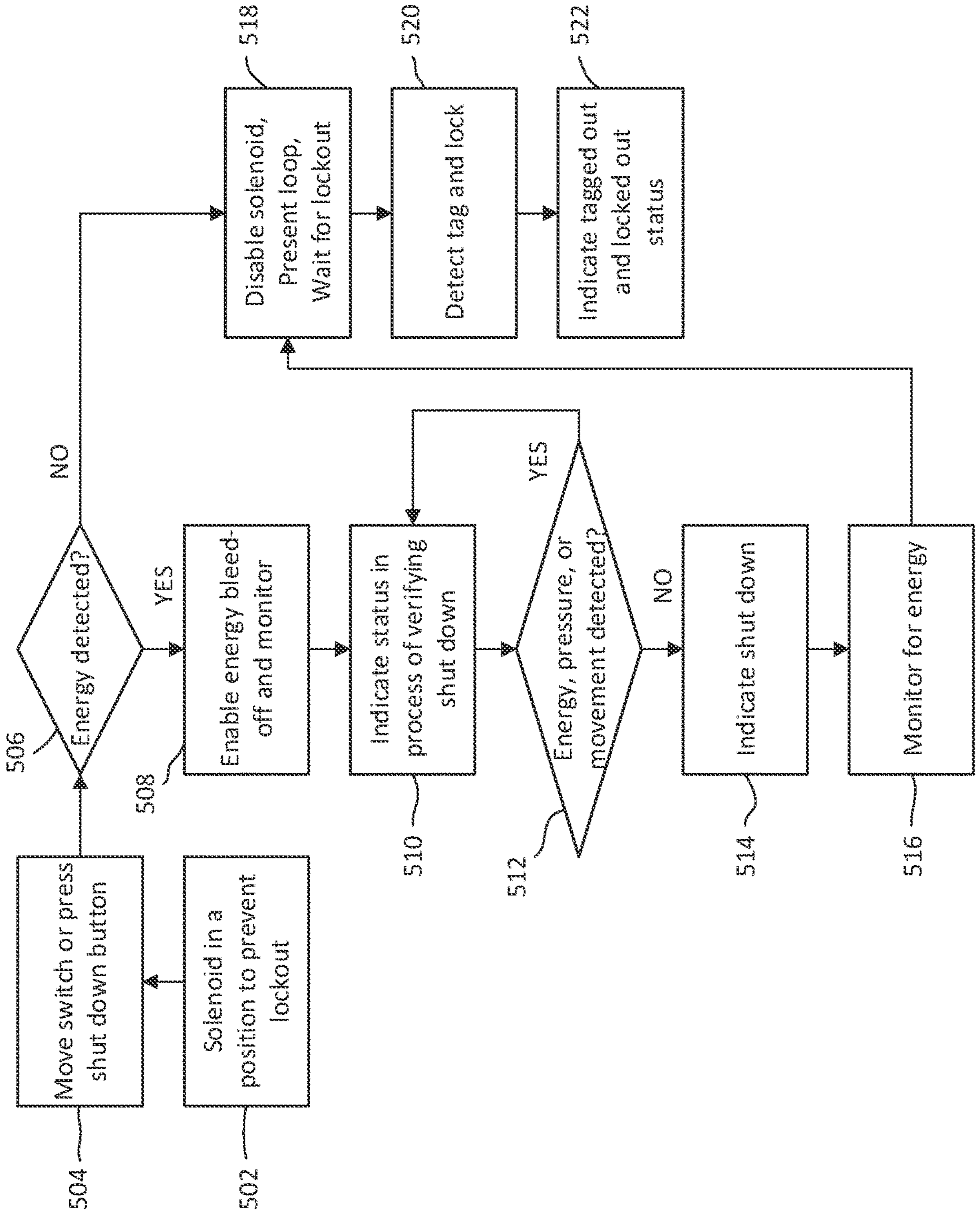
FIG. 2 illustrates a shut down and lock out process of an embodiment.

FIG. 2 illustrates a shut down and lock out process of the system according to an embodiment.

Prior to the shut down and lock out process, a solenoid of one or more lockouts of the system may be in a position (e.g. actuated position) to prevent lockout from occurring (502).

The shut down process is initiated by a switch or button of the system. For example, a user may move a switch or press a shut down button of the system (504). Following, the system may determine whether any energy (or alternatively, energy above a predetermined amount) is within one or more sub-systems of the system based on sensors of the system (506) If any energy is detected (or alternatively, energy above a predetermined amount), the system will bleed the energy from the sub-system that includes the energy and monitor (508). For example, the lockout controller 130 may control one or more of the first control valve of the second control system 310 and the second control valve and/or vent of the third control system 410 to bleed energy. The system may also monitor energy and movement of the sub-systems with, for example, the lockout controller 130 using, for example, the various sensors of the system. The system may indicate the status of the process for verifying shutdown (510) and, so long as pressure or movement is detected (or pressure or movement above a predetermined amount is detected) (512), non-completeness of shut down may be indicated.

Once the energy is removed, the system may indicate shut down (514) while still monitoring energy or movement in the system (516).

Following shut down and/or when no energy (or no energy above a predetermined amount) is detected in the system, the system may disable the solenoid of one or more lockouts of the system to allow or cause the lockout to move into a lockout position so as to present a loop of the lockout(s), and wait for lockout to occur (518). In an embodiment, a lockout and the loop of the lockout may be provided in the power lockout system 110, and the loop may be presented or allowed to be presented by control of the lockout controller 130. For example, the lockout controller 130 may control a solenoid, acting as an actuator, to cause or to allow the loop to be presented.

Alternatively or additionally, the lockout controller 130 may control the lockouts of the system (e.g. within the first control system 210, second control system 310, and/or the third control system 410) to respectively present, or allow respective presentation of, a loop for lockout by controlling a respective solenoid within each lockout.

The lockout controller 130 may wait for lock out of the power lockout system 110, and/or one or more of the lockouts of the sub-system(s), to be completed. For example, lock out may be determined to be completed by detecting when a locking device is inserted into the lockout (520). The lockout device may be anything that locks the lockout in the locked out position. The lockout device may be, for example, a bolt or a tag out pad lock.

The lockout device may be detected using, for example, a sensor that detects conductivity, and the sensor being communicatively connected to or integrated with the lockout controller 130. When the lockout device is detected using conductivity, the system may then indicate the system or sub-system, in which a lockout device has been inserted in the loop for lockout, has been correctly tagged and locked out. For example, the lockout controller 130 may detect when the locking device is inserted into the loop, based on conductivity sensed with respect to one or both of the locking device and the loop. In an embodiment, the presence of the locking device within the loop may complete a circuit that is detected by the lockout controller 130, or change a voltage or current that is detected by the lockout controller 130, thereby indicating that the presence of the locking device within the loop.

Once tag & lock out is detected, the system may indicate that the system (or sub-system) is tagged out and locked out (522). Indication by the system may be done by, for example, the lockout controller 130 controlling at least one display or at least one light to indicate tag out and lock out.

Figure 3:
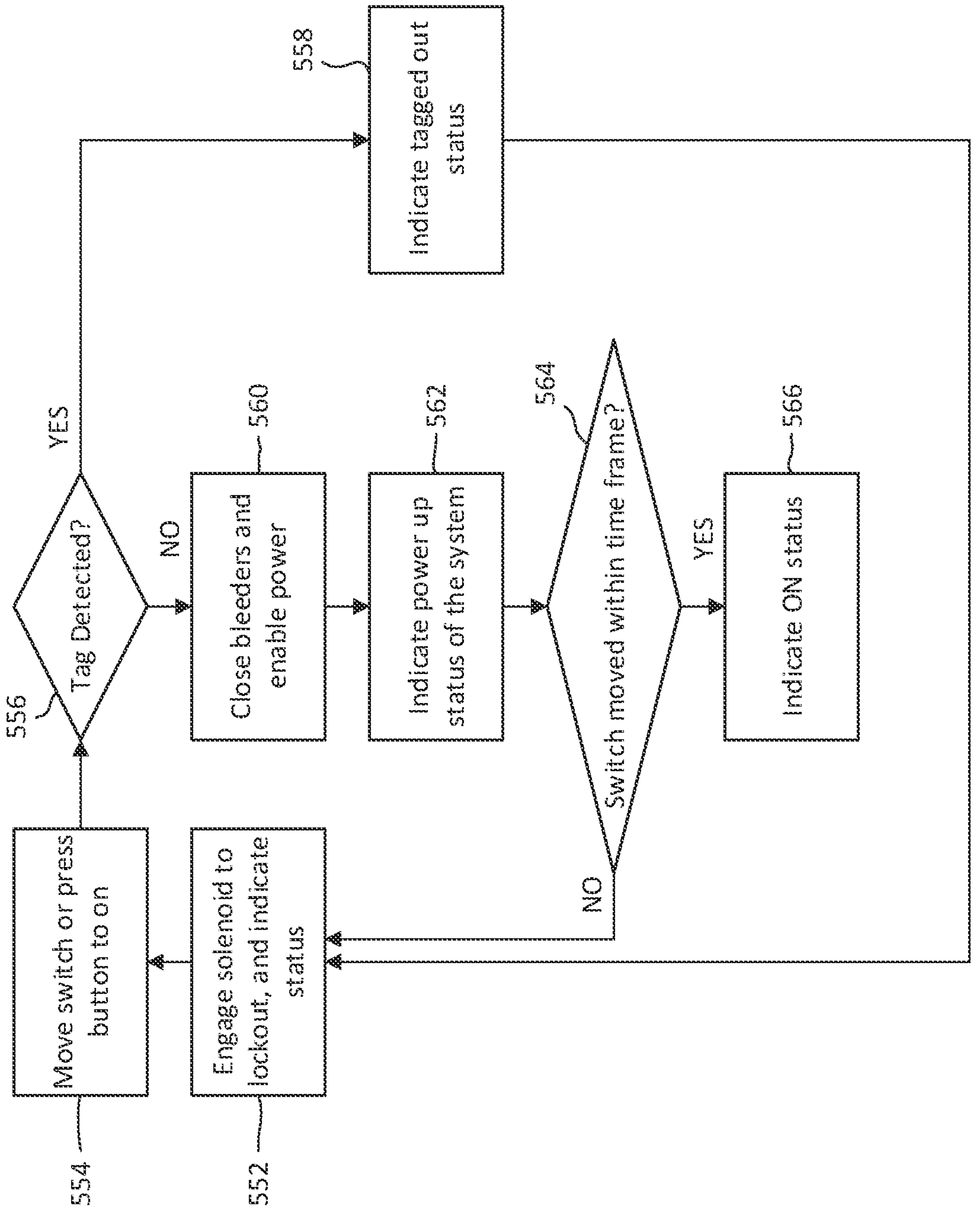
FIG. 3 illustrates a power up sequence of an embodiment.

FIG. 3 shows a power up sequence of an embodiment.

While the system is off, a solenoid (e.g. power lockout solenoid) may be engaged such that the lockout is in the "locked out" position, and the status of the lock out may be indicated (552). Following, the system may be turned on by a user manipulating a button or a switch of the system (554). The system may sense for detection of the lockout device, such as a tag, within the lockout (556).

If the lockout device is detected, the system may start indicating or continuing indicating a tagged out status (558). The tag, if detected, may cause the lockout controller 130 to prevent the system from powering up and/or to indicate an error.

If the lockout device is not detected, the system may control bleeders of the system to close and may enable power (560). For example, with reference to FIG. 1, if a lockout device is not detected in the lockout of the second control system 310 of the hydraulic system, the lockout controller 130 may control the valve of the second control system 310 of the hydraulic system to close and the power lockout system 110 to stop locking out power to the second motor drive 322 of the hydraulic system. For example, a solenoid (e.g. power lockout solenoid) may be disengaged or engaged to allow movement of the bar and the power knife switch of the power lockout system 110, and the bar and power knife switch may be automatically or manually moved. Following, the system may indicate the power up status of the system (or sub-system) (562). For example, the lockout controller 130 may cause an indicator to flash, such as a power up indicator.

The system may then determine whether an appropriate button or switch of the system is moved with a specified time frame (564). If the appropriate switch or button is moved within the specified time frame, the system may enter an "on" status, which may be indicated with at least one of the indicators (566). The switch or button may be the power knife switch 611 illustrated in FIG. 5, which when moved may cause power to be supplied to one or more of the sub-systems, or another switch or button. In an embodiment, the "on" status of the system may be indicated only when all or specified sub-systems of the system are within proper operating ranges. For example, when all or specified sub-systems have no tag within their respective lock outs, all bleeders are closed and power is enabled. Alternatively or additionally, each sub-system of the system may be indicated as "on" after an individual power up sequence is completed with respect to the sub-system. If the appropriate switch or button is not moved within the specified time frame, the system may re-engage the solenoid such that the lockout is in the "locked out" position, and indicate the status of the lockout (552).

Figure 4:
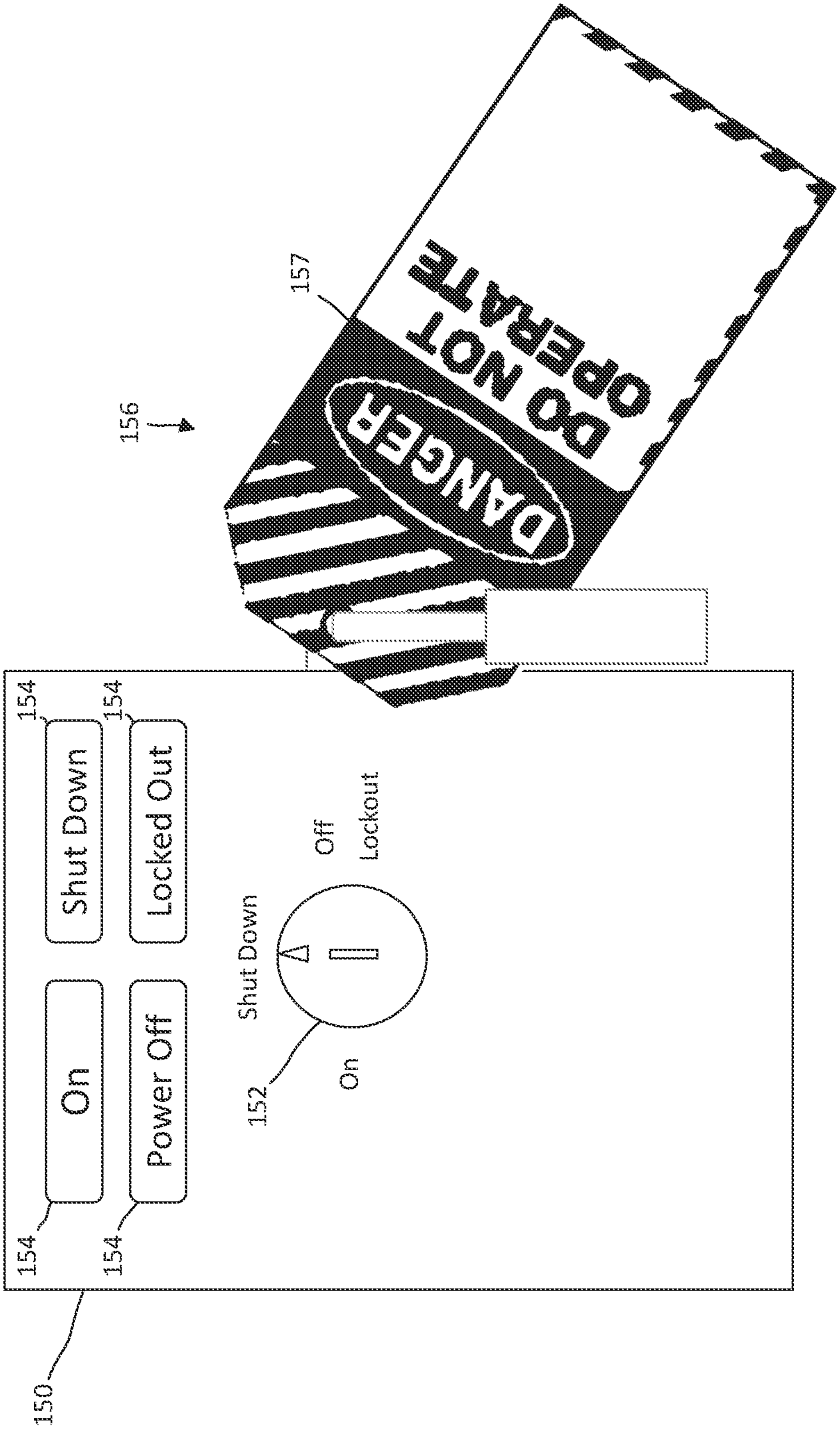
FIG. 4 illustrates a control panel for a power lockout system of an embodiment.

FIG. 4 shows an example of a control panel 150 for the system. The control panel 150 may include buttons or switches 152 for turning the system to, for example, "on", "shut down", and "off" or "lockout." The control panel 150 may include indicators 154. For example, the indicators 154 may include lights that, when turned on, indicate a status of the system. Alternatively or additionally, the indicators 154 may implemented on one or more displays. Alternatively or additionally, the buttons or switches 152 may be digital buttons or switches that are implemented by one or more displays. The control panel 150 may also include a lockout system 156 which includes the tag 157 to cause lock out. The control panel 150 may be a part of the monitoring system, and may be integrated with the lockout controller 130 and/or the power lockout system 110 and/or any of the lockouts of the sub-systems (e.g. with the first control system 210, the second control system 310, and/or the third control system 410).

Once the power off is indicated, the system can be locked out. In an embodiment, this can also be automatic upon off and tag out. The control panel 150 illustrated in FIG. 4 may be used with a process including an interim step of shut down to allow for discharge and interlock timing.

Figure 5:
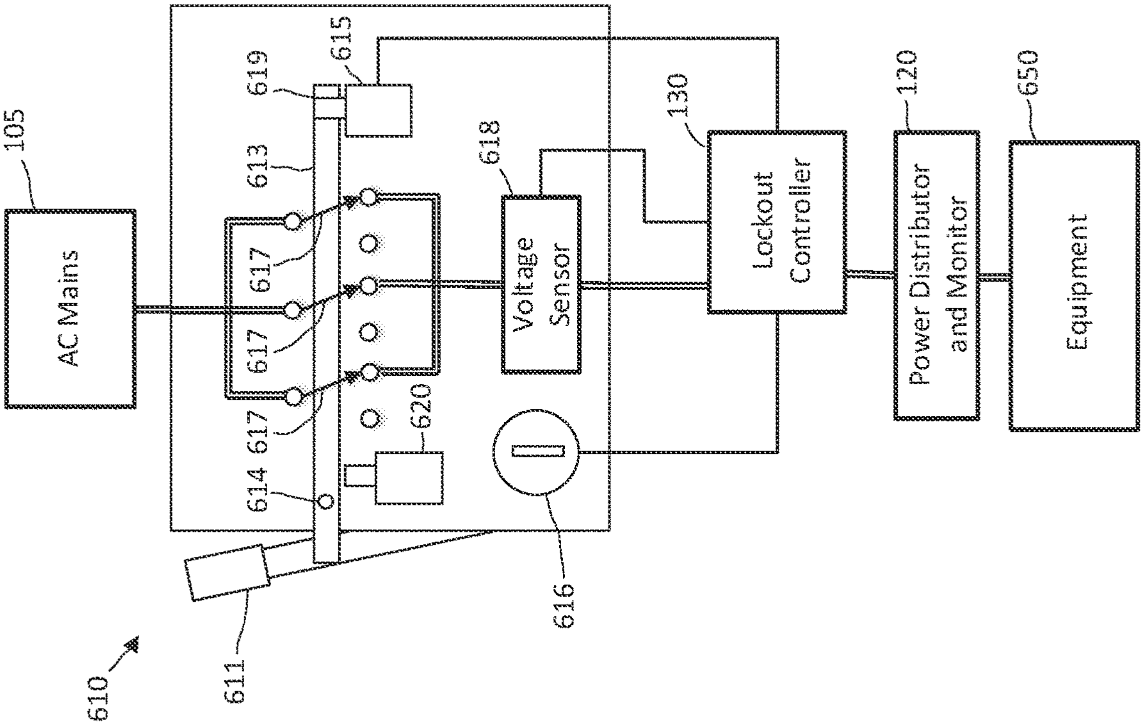
FIG. 5 illustrates a monitoring system of an embodiment.

FIG. 5 illustrates a monitoring system including a power lockout system 610 of an embodiment. The power lockout system may be, for example, implemented as the power lockout system 110 illustrated in FIG. 1 and/or the lockouts of the control systems illustrated in FIG. 1.

The monitoring system (which may also be referred to as a safety system) may assure that the sub-systems in the system are properly powered down and properly powered back up for safe use.

The power lockout system 610 may include, for example, a power knife switch 611, a switch bar 613 with a tag out lock hole 614, a solenoid lockout preventer 615, a post lockout key enable 616, and at least one switch 617. The power lockout system 610 may also include a voltage sensor 618 that senses a voltage between AC mains 105 and the equipment 650.

The power lockout system 610 may be connected to or include, for example, a power supply (e.g. AC mains 105), a lockout controller 130, a power distributor and monitor 120, and equipment 650. The equipment 650 may be, for example, one or more devices (e.g. first motor 220, pump 320, compressor 420) for driving sub-systems of the system.

As shown in FIG. 5, the lockout controller 130 is connected between the power distributor and monitor 120 and the power lockout system 610. However, the lockout controller 130 may be located anywhere in the system, so long as the lockout controller 130 may accomplish at least one aspect of the lockout controller 130. For example, the power distributor and monitor 120 may be connected between the power lockout system 110 and the lockout controller 130 as illustrated in FIG. 1.

The power lockout system 610 may, in an embodiment, perform any number of the functions of the lockout controller 130 illustrated in FIG. 1 with at least one processor, with memory, included in the power lockout system 610. The monitoring system, including the power lockout system 610, may be powered in isolation from the sub-systems and monitor the sub-systems, including the equipment 650 in the sub-systems.

The AC mains 105 may be able to supply power to the equipment 650 through the at least one switch 617 of the power lockout system 610. When the switch bar 613 is moved to a position for lock out (e.g. leftward in FIG. 5), such that the tag out lock hole 614 is exposed, the switch bar 613 may cause the at least one switch 617 to move such that at least on conductive path is broken between the AC mains 105 and the equipment 650, thereby preventing power from the AC mains 105 to be provided to the equipment 650, thus causing a power lockout to the equipment 650. In such position, the lockout controller 130 may sense, via the voltage sensor 618, that current is not being supplied from the AC mains 105 to the equipment 650. Alternatively or additionally, the power distributor and monitor 120 may also detect power (or voltage or current) provided to various sub-system components of the system.

In an embodiment, the movement of the switch bar 613 may physically actuate the at least one switch 617. Alternatively, the movement of the switch bar 613 may be sensed by a sensor, adjacent to the switch bar 613, the sensor sending a signal that either directly or indirectly causes an actuator to move the at least one switch 617. For example, the lockout controller 130 may receive a signal from the sensor and cause actuation of the at least one switch 617, or a processor in the lockout system 610 may receive the signal and cause actuation of the at least one switch 617.

The power knife switch 611 may be manipulated by a user to move the switch bar 613 to and from the position for lockout. The movement from a position other than lockout to the position of lockout of the switch bar 613 may cause the tag out lock hole 614 of the switch bar 613 to move from a hidden position to an exposed position, in which a power lockout device may be inserted there through so as to provide a safety means that physically stops the switch bar 613 and/or the power knife switch 611 from moving to a position other than lockout (e.g. a non-lockout position). The solenoid lockout preventer 615 may be a solenoid that causes the switch bar 613 to be prevented from moving to the position for lockout. In an embodiment, the solenoid lockout preventer 615 may prevent the switch bar 613 and the power knife switch 611 from moving to a position for lock out until energy is removed from the system. For example, the solenoid lockout preventer 615 may include a shaft that engages or locks into a receiving hole 619 in the switch bar 613 such as to prevent the switch bar 613 from moving, and disengages or unlocks from the receiving hole 619 such as to allow the switch bar 613 to move when it is safe to move. The power knife switch 611 may, for example, only be moved when the solenoid lockout preventer 615 is disengaged.

In an embodiment, the solenoid lockout preventer 615, or another actuator, may prevent the switch bar 613 from moving from the position for lockout to another position in which power may be supplied to the equipment 650 through the at least one switch 617. For example, a power lockout solenoid 620 may be used. The power lockout solenoid 620 may, for example, include a shaft that engages or locks into a receiving hole 619 in the switch bar 613 such as to prevent the switch bar 613 from moving, and disengages or unlocks from the receiving hole 619 such as to allow the switch bar 613 to move, in a similar manner to the solenoid lockout preventer 615. The combination of the power lockout solenoid 615 and the lockout device provide multiple safety devices for preventing a lockout of the system from being terminated prematurely.

According to the operation of the solenoids, manual operation of the power knife switch 611 may prevented until power up or power down of the system is complete and safe. The solenoids may be included in and powered by the isolated monitoring system.

The solenoids for safety interlock may alternatively be, for example, a motor, a mechanized switch or any other types of interlock. In other words, the solenoids may be any type of actuator, including, for example, a electromechanical actuator. The solenoids may be powered by the monitoring system and lock the system from being locked off until the system is off and then prevents the system from being turned back on until proper operating conditions are met for the power systems. The power knife switch 611 may, for example, alternatively be any other type of switch.

In an embodiment, the solenoid lockout preventer 615, or any other actuator may actuate the switch bar 613 to move to and from the lockout position, and may be actuated based on control by, for example, the lockout controller 130 or a processor(s) of the power lockout system 610.

An optional key may be used to initiate power up of the system and unlock the at least one switch 617 physically when used with the post lockout key enable 616. For example, when a key is used with the post lockout key enable 616, the post lockout key enable 616 may send a signal to the lockout controller 130, and the lockout controller 130 may unlock the solenoid lockout preventer 615 so that the power knife switch 611 may be moved to a non-lock out position. Alternatively, the lockout controller 130 may control the at least one switch 617 and/or the switch bar 613 to automatically move to a non-lockout position based on the signal, by controlling an actuator.

Figure 6:
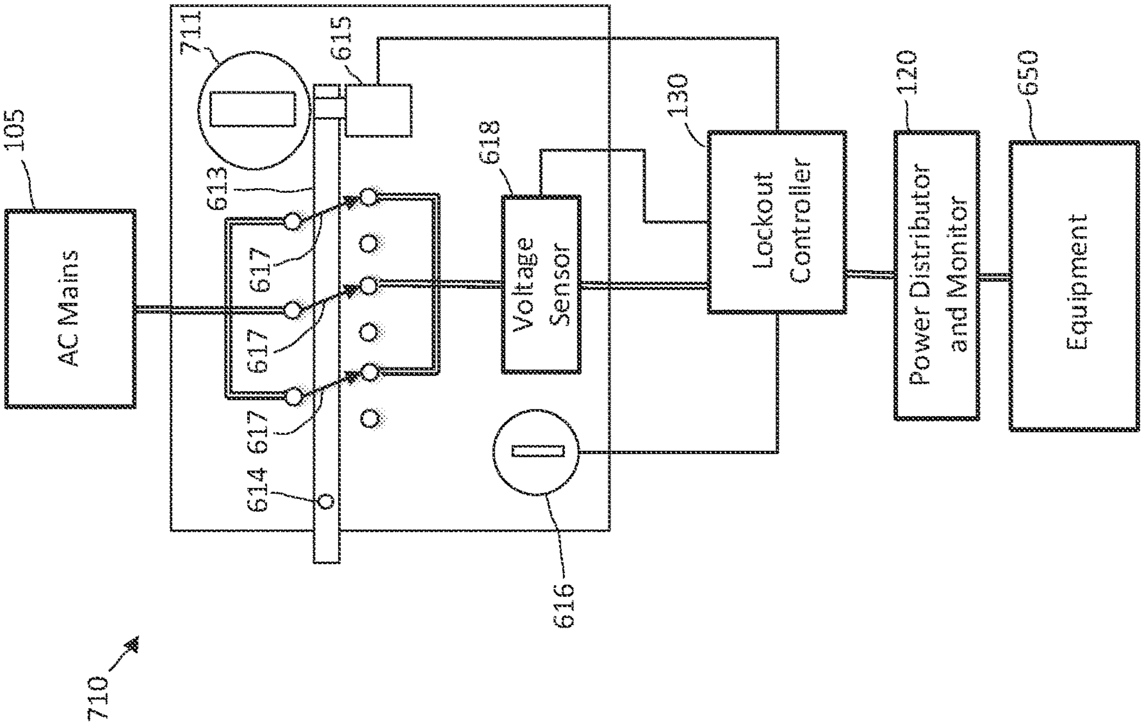
FIG. 6 illustrates a monitoring system of an embodiment.

FIG. 6 illustrates an embodiment with a power lockout system 710 that includes a rotary switch 711 with a tag out lock. In the embodiment, the rotary switch 711 may directly or indirectly (via the lockout controller 130 or a processor within the power lockout system 710) control the switch bar 613 or allow the switch bar 613 to move to and from a lock out position. Movement of the rotary switch 711 from a lockout position may be inhibited by use of the tag out lock.

Figure 7:
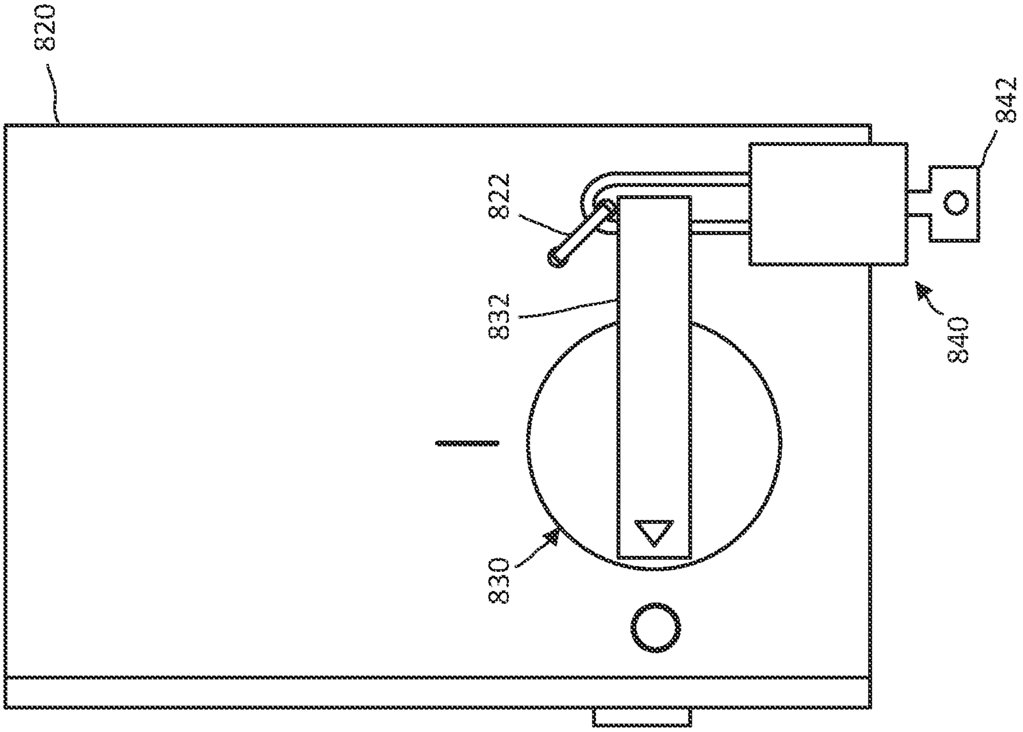
FIG. 7 illustrates a first view of a power lockout system according to an embodiment.

FIG. 7 illustrates a first view of a power lockout system 810 according to an embodiment. The power lockout system 810 may be configured to be the same or similar to the power lockout system 110, the power lockout system 610, and/or the power lockout system 710. As shown in FIG. 7, the power lockout system 810 may include a container 820 that includes, for example, the processor and memory of the power lockout system 810. On a first outer side of the container 820, a rotary switch 830 may be provided which causes the system to enter an on or off mode based on a position of the rotary switch 811. While the rotary switch 830 is in an “off” position, a lockout device 840 (e.g. a lock), may be inserted through a bar 832 of the rotary switch 830 and a loop 822 on the container 820. Accordingly, the rotary switch 830 may be prevented from moving to an “on” position. The lockout device 840 may be provided with a key 842 that may be configured to unlock and lock the locking device from the bar 832 of the rotary switch 830 and the loop 822.

Figure 8:
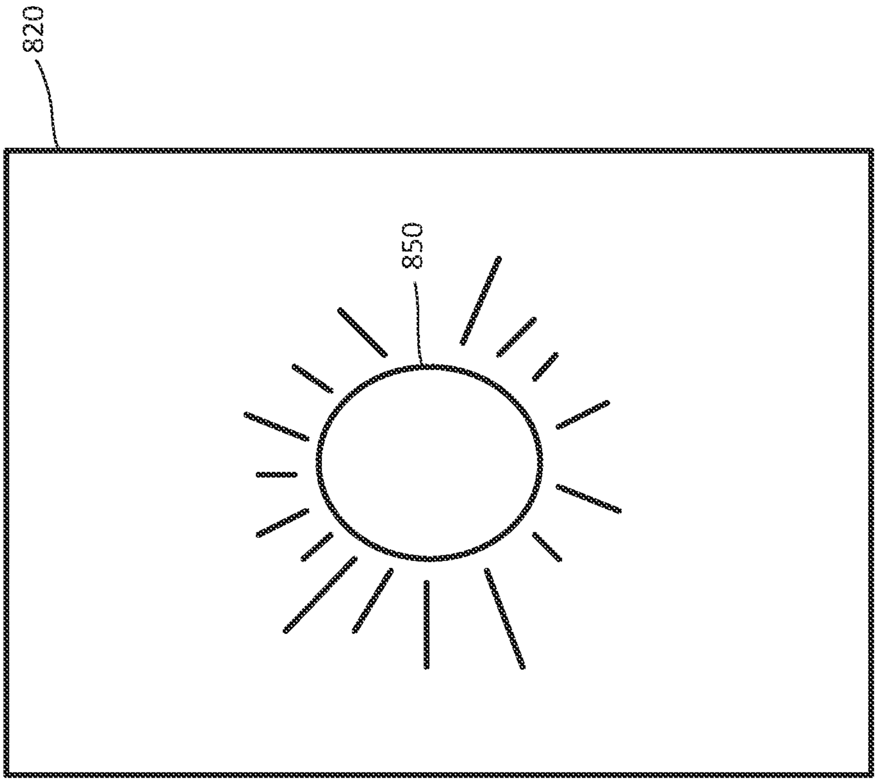
FIG. 8 illustrates a second view of the power lockout system according to an embodiment.

FIG. 8 illustrates a second view of the power lockout system 810 according to an embodiment. As shown in FIG. 8, a second outer side of the container 820 may include at least one indicator 850 (e.g. a light) configured to light up to indicate the presence of energy with the system.

Figure 9:
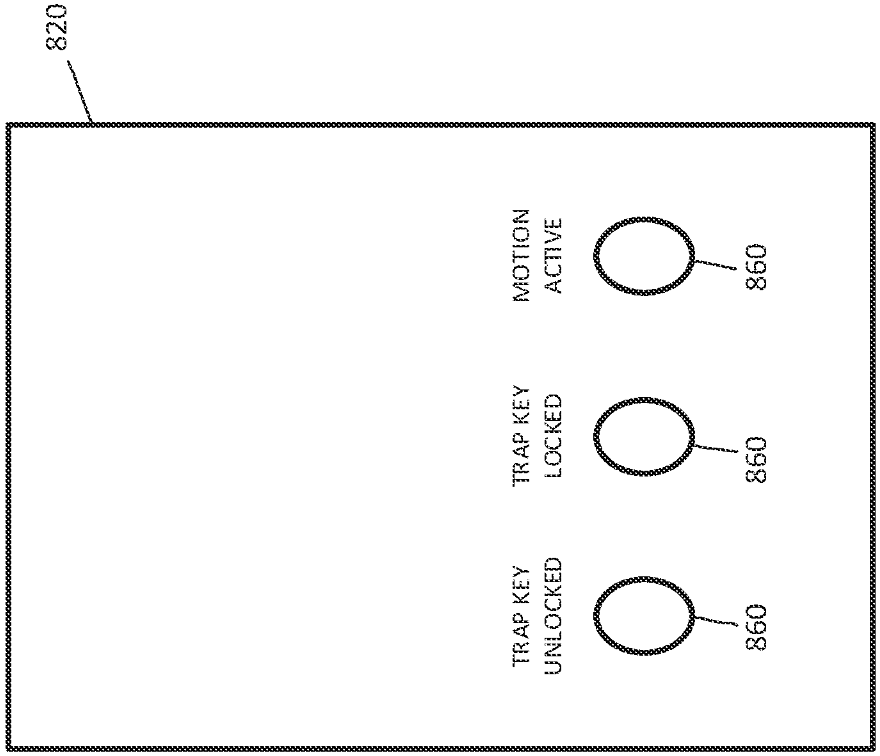
FIG. 9 illustrates a third view of the power lockout system according to an embodiment.

FIG. 9 illustrates a third view of the power lockout system 810 according to an embodiment. As shown in FIG. 9, a third outer side of the container 820 may include at least one indicator 860 (e.g. light) configured to light up to indicate a respective state of the system. One or more of the indicators 860 may indicate for example, power on, shutting down, and power off.

Some embodiments of the present disclosure may include the following aspects.

(A) Multiple Interlocks for Locking Out, Tagging Out and Turning the System Back on A system of an embodiment may use multiple sensors and an interlock system that is configured to bleed various types of power from the sub-systems as part of the power down process. The process of bleeding and determining that all sub-systems are stopped and do not have energy potential may be performed and/or controlled by a hazardous energy controller of the system. The hazardous energy controller may be configured to confirm the sensors and interlock positions before turning power on and when locking out power.

(B) Monitoring and Controlling Multiple Sub Systems with Hazardous Power Monitor Controller A hazardous energy controller of an embodiment may monitor air pressure and storage, hydraulic energy and storage, along with mechanical energy and movement before indicating a safe access and tag out readiness. The system may be configured to use a lockout device (e.g. a tag) to complete a circuit that the system detects to determine that the system is tagged out.

(C) Multiple Power Bleed Off and Monitoring Systems

A system of an embodiment may enable separate control circuits with valves to bleed off, for example, air energy and hydraulic energy. A motor controller may detect voltage to assure that the energy is removed from the sub-system and then measure conduction across the motor to assure the motor has stopped.

(D) No Single Point of Failure

Sensors of a system of an embodiment for sensing air pressure, hydraulic pressure, and voltage may be used in conjunction with sensors for detecting valve positions, conduction across a motor(s), and tag out conduction from the tag system. The hazardous energy controller may be a secondary system that works in conjunction with a primary controller to confirm proper operation as part of a shut down and power up process of the system.

(E) Measuring Voltage and Conductivity to Assure Motor Position

A system of an embodiment may be configured to measure motor voltage as a first measurement to assure energy has been removed (e.g. bleed off) from the system. The system may also be configured to measure, as an additional measurement, conduction across the motor while still monitoring zero voltage pre and post conduction measurements.

(F) Measuring and Bleeding Pressure in System Before Allowing Lock Out

A hazardous energy controller of an embodiment may control multiple valves when power down or up is requested. The system may be configured to use the valves in combination with sensors to remove or replace energy from multiple sub-systems when requested and to confirm the status of such processes.

Each of the systems (e.g. monitoring system, power lockout system, lockouts) and controllers (e.g. lockout controller 130) described above may include one or more memory that stores computer program code, and at least one processor that is configured to access the computer program code stored in the one or more memory of the system (or controller) and operate as instructed by the computer program code to perform the functions of the system (or controller) described herein. For example, the code stored in a system (or a controller) includes code that is configured to instruct the at least one processor of the system (or the controller) to perform at least one function (e.g. communication to or monitoring of other components of the system, and control of an actuator of the system or a sub-system.

In an embodiment, the monitoring system may include a first mechanism to prevent lock out until authorized by the hazardous power monitor and a second mechanism to prevent power up until properly powered. The first mechanism may be the solenoid lockout preventer 615 and the second mechanism may be, for example, the power lockout solenoid 620. Actuation of the mechanisms may be based on a request(s) from a pushbutton(s) for power up and down. As an alternative to the first and second mechanisms, the functions of the first mechanism and the second mechanism may be performed by a single mechanism with a first locking position and a second locking position.

Directional terms, such as "vertical," "horizontal," "top," "bottom," "upper," "lower," "inner," "inwardly," "outer" and "outwardly," are used to assist in describing embodiments of the disclosure based on the orientation of the embodiments shown in the illustrations. The use of directional terms should not be interpreted to limit embodiments of the disclosure to any specific orientation(s).

The above description is that of non-limiting examples embodiments of the present disclosure. Various alterations and changes can be made without departing from the spirit and broader aspects of the disclosure, which are to be interpreted in accordance with the principles of patent law including the doctrine of equivalents. This disclosure is presented for illustrative purposes and should not be interpreted as an exhaustive description of all embodiments of the disclosure or to limit the scope of the claims to the specific elements illustrated or described in connection with these embodiments. For example, and without limitation, any individual element(s) of the disclosure may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present disclosure is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A system comprising:

at least one sub-system, each sub-system of the at least one sub-system comprising a first actuator configured to control a supply of a respective energy, the respective energy controlled by the first actuator of the each sub-system being one from among air pressure, hydraulic pressure, and mechanical energy of an actuated body;

a power lockout system comprising:

at least one switch configured to open and close an electrical connection between a power supply and the first actuator of one or more of the at least one sub-system, a body configured to move between a first position and a second position, the first position being a position in which the body causes the at least one switch to open the electrical connection and in which a portion of the body is configured to engage with a lockout body that is configured to cause the body to be locked out in the first position, and the second position being a position in which the body causes the at least one switch to close the electrical connection, and a second actuator configured to control the body to move into or maintain in the first position or the second position; and at least one processor configured to control, during a power down process, the first actuator of the each of the at least one sub-system to reduce the respective energy of the sub-system;

wherein the at least one processor is further configured to control, during the power down process, the second actuator of the power lockout system based on a level of the respective energy of the one or more of the at least one sub-system.

2. The system of claim 1, wherein the at least one sub-system includes a first sub-system and a second sub-system.

3. The system of claim 2, wherein the first actuator of the first sub-system is configured to control a supply of one from among a group of air pressure, hydraulic pressure, and mechanical energy of the actuated body, within the first sub-system, and the first actuator of the second sub-system is configured to control a supply of another from among the group of air pressure, hydraulic pressure, and mechanical energy of the actuated body, within the second sub-system.

4. The system of claim 3, wherein the first actuator of the second sub-system is configured to actuate a vent or valve that is configured to control a supply of air pressure or hydraulic pressure within the second sub-system, and the at least one processor is configured to control, during the power down process, the second sub-system to reduce the supply of air pressure or hydraulic pressure within the sub-system by actuating the vent or valve, based on a signal from at least one sensor of the second sub-system.

5. The system of claim 1, wherein the at least one sub-system includes a first sub-system, a second sub-system, and a third sub-system, the first actuator of the first sub-system is a motor that is configured to cause a supply of the mechanical energy, within the first sub-system, by receiving electrical energy, the first actuator of the second sub-system is a motor that is configured to cause a supply of hydraulic pressure, within the second sub-system, by receiving electrical energy, and the first actuator of the third sub-system is a motor that is configured to cause a supply of the air pressure, within the third sub-system, by receiving electrical energy.

6. The system of claim 1, wherein the at least one processor is further configured to control the second actuator, during the power down process, to allow the body to move into the first position based on the respective energy of the one or more of the at least one sub-system being equal to or below a predetermined level.

7. The system of claim 6, wherein the second actuator comprises a pin that is configured to maintain the body in the second position by actuating into a hole of the body when the body is in the second position.

8. The system of claim 6, wherein the second actuator is configured to actuate the body into the first position or the second position.

9. The system of claim 1, wherein the at least one processor is configured to control, during the power down process, the first actuator of each of the at least one sub-system to reduce the respective energy of the sub-system based on a signal from at least one sensor of the at least one sub-system.

10. A monitoring system for a machine system, the machine system including at least one sub-system that each includes a first actuator configured to control a supply of a respective energy, the respective energy controlled by the first actuator of each sub-system of the at least one sub-system being one from among air pressure, hydraulic pressure, and mechanical energy of an actuated body, the monitoring system comprising:

a power lockout system comprising:

at least one switch configured to open and close an electrical connection between a power supply and the first actuator of one or more of the at least one sub-system, a body configured to move between a first position and a second position, the first position being a position in which the body causes the at least one switch to open the electrical connection and in which a portion of the body is configured to engage with a lockout body that is configured to cause the body to be locked out in the first position, and the second position being a position in which the body causes the at least one switch to close the electrical connection, and a second actuator configured to control the body to move into or maintain in the first position or the second position; and at least one processor configured to control, during a power down process, the first actuator of each of the at least one sub-system to reduce the respective energy of the sub-system based on a first signal from at least one sensor of the at least one sub-system, wherein the at least one processor is further configured to control, during the power down process, the second actuator of the power lockout system based on a level of the respective energy of the one or more of the at least one sub-system.

11. The monitoring system of claim 10, wherein the at least one processor is further configured to control the second actuator, during the power down process, to allow the body to move into the first position based on the respective energy of one or more of the at least one sub-system being equal to or below a predetermined level.

12. The monitoring system of claim 11, wherein the second actuator comprises a pin that is configured to maintain the body in the second position by actuating into a hole of the body when the body is in the second position.

13. The monitoring system of claim 11, wherein the second actuator is configured to actuate the body into the first position or the second position.

14. The monitoring system of claim 11, wherein the at least one processor is configured to control the second actuator, during the power down process, to allow the body to move into the first position based on a second signal from the at least one sensor of the at least one sub-system indicating that the respective energy of the one or more of the at least one sub-system is equal to or below the predetermined level.

15. A method of shutting down a system that includes at least one sub-system, each sub-system of the at least one sub-system including a first actuator configured to control a supply of a respective energy, the respective energy controlled by the first actuator of the each sub-system being one from among air pressure, hydraulic pressure, and mechanical energy of an actuated body, the method comprising:

receiving, by at least one processor, a signal that indicates the system is to be shut down;

determining, by the at least one processor, based on a signal from at least one sensor of the each sub-system, whether the respective energy of the each sub-system is equal to or below a respective predetermined level;

controlling, based on determining that the respective energy of the at least one sub-system is not equal to or below the respective predetermined level by the at least one processor, the first actuator of each of the at least one sub-system to reduce the respective energy of the at least one sub-system;

controlling, based on determining that the respective energy of the at least one sub-system is equal to or below the respective predetermined level by the at least one processor, a second actuator of a power lockout system to allow a body of the power lockout system to move from a second position, in which the body closes an electrical connection between a power supply and the first actuator of the at least one sub-system, to a first position, in which the body causes the electrical connection to be opened; and engaging, when the body of the power lockout system is in the first position, a lockout body with the body such that the lockout body causes the body to be locked out in the first position.

16. The method of claim 15, further comprising:

detecting, by the at least one processor, whether the lockout body is engaged with the body of the power lockout system.

17. The method of claim 15, wherein the second actuator includes a pin that is configured to maintain the body in the second position by actuating into a hole of the body when the body is in the second position.

18. The method of claim 15, wherein the second actuator is configured to actuate the body into the first position or the second position.

19. The method of claim 15, wherein the first actuator of each of the at least one sub-system is one from among a motor, a valve actuator, and a vent actuator.

20. The method of claim 15, wherein the at least one sub-system includes a first sub-system and a second sub-system, the first actuator of the first sub-system is configured to control a supply of one from among a group of air pressure, hydraulic pressure, and mechanical energy of the actuated body, within the first sub-system, and the first actuator of the second sub-system is configured to control a supply of another from among the group of air pressure, hydraulic pressure, and mechanical energy of the actuated body, within the second sub-system.

* * * * *